(No Model.)
J. G. ROTH.
VEHICLE SPRING.
No. 333,257. Patented Dec. 29, 1885.
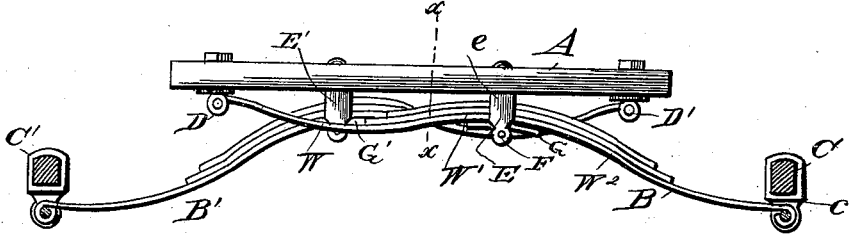
Fig. 1.
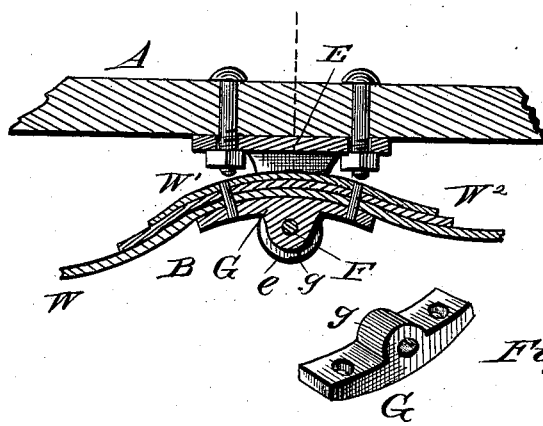
Fig. 2.
Fig. 4.
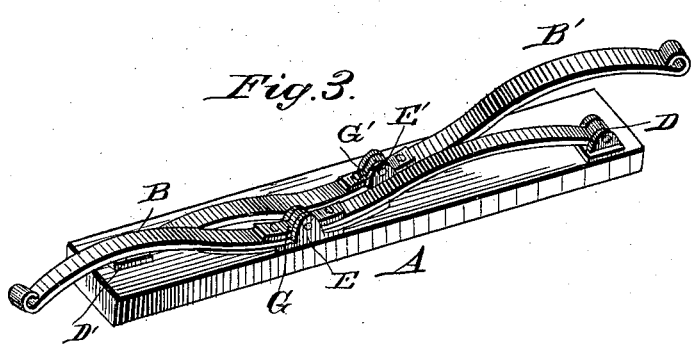
Fig. 3.
WITNESSES
Phil C. Dietrich.
W. C. Stierlin.
INVENTOR
J. George Roth
by
J. H. Alexander
Attorney

UNITED STATES PATENT OFFICE.

J. GEORGE ROTH, OF SOUTH BEND, INDIANA.

VEHICLE-SPRING.

SPECIFICATION forming part of Letters Patent No. 333,257, dated December 29, 1885.

Application filed April 18, 1885. Serial No. 162,612. (No model.)

*To all whom it may concern:*

Be it known that I, J. GEORGE ROTH, of the city of South Bend, in the county of St. Joseph and State of Indiana, have invented certain new and useful Improvements in Vehicle-Springs; and I do hereby declare that the following is a full, clear, and exact description thereof, reference being had to the accompanying drawings, and to the letters of reference marked thereon, which form part of this specification.

Figure 1 represents a side view of the front or rear cross-bar of a vehicle with the improved springs attached. Fig. 2 represents a sectional view of a part of one spring, showing its attachment to the rock-plate, and a perspective view of one rock-plate; and Fig. 3 is a perspective view of the springs attached to the cross-bar, the said view being from the under side; and Fig. 4 is a perspective view of one of the rock-bars.

This invention relates to vehicle-springs, and has for its object to prevent the body of the carriage from lateral sway, to cause the cross or spring bar to move up and down with a parallel motion, to prevent side tipping when the vehicle is unequally loaded, and to avoid thrust on the side bars from the up-and-down motion of the vehicle.

The invention is particularly adapted for buggies.

The invention consists in the construction and novel arrangement of parts hereinafter described, and pointed out in the appended claims.

Referring to the accompanying drawings by letter, A designates the cross-bar or spring-bar, B B' the springs, and C C' the side bars, to which the lower ends of the respective springs are attached. As both springs are identical in shape and attachments, the detailed description of one only is necessary. The other and its attachments need only be mentioned by reference-letters.

$x\ x$ is a vertical line passing through the center of the spring-bar A.

D is a depending bracket, bolted, as shown, to the under surface of the spring-bar near one end thereof. The bracket D has secured between its ears a transverse rod or bolt, upon which the coiled upper end of the spring B pivots. The spring B thence makes the downward curve W, the upward curve W', and the downward curve $W^2$, as shown, and has its lower end coiled and surrounding a transverse bar secured to the band $c$ of the side bar, C.

E is a bracket, the plate portion of which is secured by the bolts, as shown, to the under surface of the spring-bar a proper distance from the line $x\ x$ on the side opposite that to which the bracket D is secured.

$e\ e$ are two similar arms depending from the bracket E, and having their lower ends united by the transverse rod F.

G is a rock-plate, which pivots on the rod F by means of a transverse opening through the lug $g$, which crosses centrally its lower surface. The upper surface of the plate G is convex, and fits centrally below and into the curve W' of the spring B, the arms of the plate on each side of the lug $g$ being secured by bolts to the spring, as shown. The center or heaviest part of all the leaves of the spring corresponds with the center of the rock-plate.

D' is a bracket similar to D, but secured to the opposite end of the spring-bar.

E' is a bracket similar to E, carrying the rock-plate G', and secured at an equal distance on the opposite side of the line $x\ x$, and C' is the side bar to which the lower end of the spring B' is attached. The attachments of the latter spring are identical with those of the spring B. The springs B and B' lie side by side, so as to have independent motion, the brackets D' and E' being near the edge of the spring-bar opposite to that near which the brackets D and E are secured.

It is evident from the foregoing description that each spring has two points of support—one on each side of the center of the spring-bar; hence an upward jar from either side will affect both springs and all four supports and make the spring-bar oscillate vertically with a parallel motion; also, loading the vehicle more on one side than the other will similarly affect both springs, and for that reason not cause side tilting. It is also evident that any lateral thrust against the side bar, C, will be prevented by the motion of the curve $W^2$ of the spring B being communicated by the rock-plate G to the curve W, which will be flexed downward thereby. The same action of course will occur with the spring B'. The same action of the plates G and G' will prevent lateral sway of the body of the vehicle.

By pivoting instead of bolting the ends of the springs both to the spring-bar and to the side bars the described actions of the invention are rendered much more effective and easy, as the pivotal points of the springs coact with the rock-plates, and cause the springs to flex more readily and under less pressure. Therefore the said pivotal points form effective combinations with the rock-shaft.

Having described my invention, I claim—

1. The combination, with the spring-bar and side bars of a vehicle, of the oppositely-extending springs B B', each pivoted at its inner end upon the spring-bar near one end of the latter, pivoted at its outer end upon one of the side bars, and supported by a laterally-oscillating joint upon the spring-bar at a point between its ends and on the opposite side of the center of said bar from its end attachment thereto, substantially as specified.

2. The combination, with the spring-bar A and side bars, C C', of the springs B B', brackets E E', and rock-plates G G', substantially as specified.

3. The combination, with the spring-bar A, brackets D D', and side bars, C C', of the springs B B', brackets E E', and rock-plates G G', substantially as specified.

In testimony that I claim the foregoing as my own I affix my signature in presence of two witnesses.

J. GEORGE ROTH.

Witnesses:
JAMES DU SHANE,
WILLIS A. BUGBEE.